Patented Feb. 13, 1923.

1,445,034

UNITED STATES PATENT OFFICE.

WALTER H. PHELPS, OF PORTSMOUTH, OHIO, ASSIGNOR OF ONE-HALF TO RUSSELL CLICK, OF PORTSMOUTH, OHIO.

POLISH AND PROCESS OF MAKING IT.

No Drawing.   Application filed March 10, 1922.   Serial No. 542,747.

*To all whom it may concern:*

Be it known that I, WALTER H. PHELPS, a citizen of the United States, residing at Portsmouth, in the county of Scioto and State of Ohio, have invented a certain new and useful Polish and the Process of Making It, of which the following is a specification.

My invention relates to polish and more particularly to fluid polish for use in cleaning, refinishing and polishing surfaces of pianos, furniture, automobiles, including leather upholstering, floors and the like.

The object of my invention is to provide a more efficient, durable and economical polish than those heretofore produced.

My invention consists of a liquid polish as a composition of matter and in the process of making it as herein set forth and claimed.

The ingredients comprising my invention are mixed in substantially the following proportions and order, the ingredients being given in bulk form for a quantity of fifty pints of the polish.

Nine pints of kerosene,
Forty pints of straw paraffin oil,
One pound of oil of myrbane,
One pound of alkanet root, or its equivalent such as one-fiftieth pound of red blood coloring for oil.

The kerosene in connection with the other ingredients acts as a cleanser, cuts the grease, gums, or other extraneous adhesive matter to be removed and adds gloss to the surface treated. It also serves to thin the composition without injury to the life thereof.

The straw paraffin oil produces a thin cover for the surface being treated and with the other ingredients eliminates mars, scratches and the like. It also preserves the wood or other surface to which it is applied and keeps it pliable to prevent checking or cracking of the finished surface.

The straw paraffin oil is also greaseless and thereby prevents finger or other marks from contact due to contact therewith or soiling any article which may be placed thereon. It further prevents the adherence of dust, lint, soot or other foreign substances.

The oil of myrbane clears the composition, acts as a dryer and assists in producing a lasting gloss when applied to the surface treated. It also serves to neutralize the kerosene odor which would otherwise predominate while being applied.

The alkanet root assists in covering and obscuring any scratches, mars or other irregular surfaces. While the best results are obtained by including the alkanet root or its equivalent a slightly inferior product which will produce good results may be obtained without including the same.

The process is as follows: Strain the straw paraffin oil through four layers or plies of muslin; also strain the kerosene through chamois or through two or more layers or plies of other muslin, then mix the strained kerosene and strained straw paraffin oil with oil of myrbane thoroughly stirring and mixing them. The alkanet root may be in natural or powdered form. It is placed in a cloth bag and immersed in a sufficient quantity of the mixture just described to thoroughly saturate it and is allowed to remain therein for a period of about forty-eight hours. The alkanet root bag is then removed and the liquid therein is strained or extracted through the cloth into the other mixture. One-half of the total mixture is then heated to a temperature nearly to the boiling point and it is then mixed with the other half thereby making a total mixture of a temperature which is substantially luke warm. After thus mixing it is allowed to ripen for a period of about twelve hours when it can be bottled ready for use.

Ripen as referred to herein means developing fully to bring the product into condition for use. When the product stands twelve hours after being mixed, it gives all the ingredients time to adjust themselves to one another. If bottled immediately after being mixed the product is lighter in color immediately after being bottled than it would be twelve hours after being bottled or standing twelve hours before being bottled. When it is allowed to stand twelve hours and then bottled, the product never changes in color but it will change to a darker color if bottled immediately after mixing. By allowing the product to stand twelve hours before bottling no change will take place in the color or shade of the product. In other words, when the product stands twelve hours before being bottled the ingredient used as a coloring has done all the coloring it possibly can and cannot change to a darker shade.

It will be apparent that my invention is capable of some modification without departure from the scope or spirit thereof, as for instance, while I have set forth a preferred combination of ingredients with given proportions, the proportions may be varied slightly and still obtain satisfactory results or the equivalent of any one or more of the given materials may be substituted for those given without departing from the spirit or scope of my invention.

To use rub a quantity of the polish upon the surface to be treated, preferably using a soft cloth, such as flannel or cheese cloth, for such purpose, to first remove any dirt, grease or other foreign substance from the surface, after which continue the rubbing of the surface either with the same cloth or with a dry cloth, preferably of the same material, for the purpose of filling any scratches, depressions or irregularities in the surface and of removing any excess of the mixture and particularly to give it an even and highly finished result.

Some of the advantages of my invention are that it is always ready for use without shaking, leaves the article ready for use immediately upon being applied, is extremely economical and easy to manufacture, is noninflammable, contains no ingredients which are harmful to the finest finished surface and produces a superior and lasting lustrous finish of the surface of the article to which it is applied. My polish is also extremely economical in use since it requires a very light application to produce the desired result. If in the treatment of leather upholstering it is occasionally rubbed in the porous surface sparingly it serves to prevent the cloths or coverings which are commonly used thereon or clothing of the user from sticking thereto.

Having described my invention and its manner of application, what I claim as new and desire to secure by Letters Patent is:

1. The herein described process which consists in straining a quantity of straw paraffin oil, straining a quantity of kerosene, then thoroughly mixing the strained kerosene and strained straw paraffin oil with oil of myrbane, then saturating a quantity of alkanet root in a quantity of said mixture allowing it to remain for a period of about forty-eight hours, then eliminating the solid portion of the alkanet root therefrom, then mixing said liquid portion with the remainder of the mixture, then heating one-half of said mixture to a temperature nearly to the boiling point, and then mixing the same with the unheated portion of the mixture thereby making a total quantity of the mixture to a temperature which is substantially luke warm, and then allowing the mixture to ripen for a period of about twelve hours ready for use.

2. The herein described process which consists in straining a quantity of straw paraffin oil, straining a quantity of kerosene, then thoroughly mixing the strained straw paraffin oil and kerosene with oil of myrbane and then heating said mixture until it becomes luke warm and then allowing it to ripen.

3. The herein described process which consists in straining substantially nine pints of kerosene, straining substantially forty pints of straw paraffin oil, then thoroughly mixing said strained ingredients with substantially a pound of oil of myrbane, then saturating substantially one pound of alkanet root in a portion of the above mixture for about forty-eight hours, then removing the solid portion of alkanet root therefrom, then placing the entire mixture together and then heating it until it is substantially luke warm and then allow it to ripen ready for use.

4. The herein described composition of matter comprising the following ingredients in substantially the proportions stated: nine pints of kerosene, forty pints of strained straw paraffin oil, one pound of oil of myrbane, all thoroughly mixed together, substantially as set forth and for the purposes specified.

5. The herein described composition of matter comprising the following ingredients in substantially the proportions stated: nine pints of kerosene, forty pints of straw paraffin oil, one pound of oil of myrbane, and one pound of alkanet root all mixed together, substantially as set forth and for the purposes specified.

WALTER H. PHELPS.